United States Patent [15] 3,687,464
Jackson et al. [45] Aug. 29, 1972

[54] SEAL

[72] Inventors: Richard H. Jackson, Downers Grove; George H. Schulz, Naperville, both of Ill.

[73] Assignee: Gits Bros. Mfg. Co., Chicago, Ill.

[22] Filed: Jan. 4, 1971

[21] Appl. No.: 103,470

[52] U.S. Cl. .................... 277/153, 277/181, 277/182
[51] Int. Cl. ............................... F02f 5/00, F02f 9/06
[58] Field of Search .......... 277/41, 51, 153, 181, 182

[56] References Cited

UNITED STATES PATENTS 2,804,324   8/1957   Stalling ..................... 277/153

Primary Examiner—Martin P. Schwadron
Assistant Examiner—Frank Susko
Attorney—Sherman, Meroni, Gross & Simpson

[57] ABSTRACT

A mechanical seal having a U-shaped cross section annular housing open to the inner diameter. Two opposed J-shaped cross section non-rigid seal members are received in the housing with the bight sections nestled and projecting below the inner diameter of the housing. An O-ring member is disposed in the housing to separate the legs of the J-shaped members and a coil spring or other constricting member is received around the inner diameter of the inner bight section.

15 Claims, 6 Drawing Figures

PATENTED AUG 29 1972 3,687,464
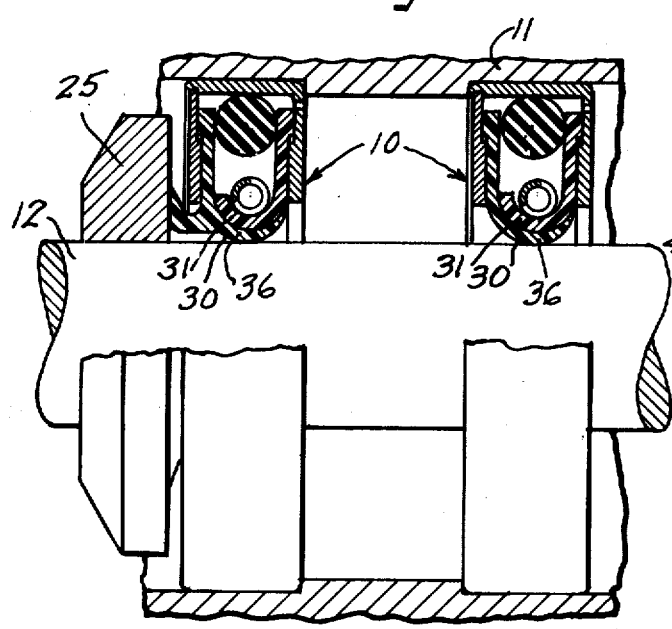
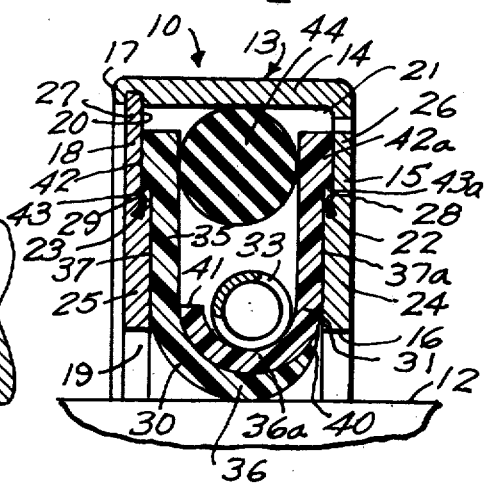
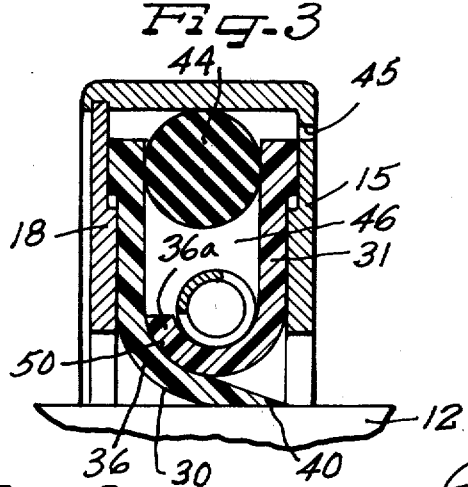
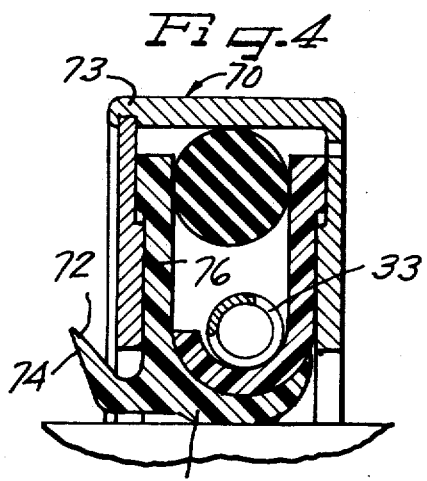
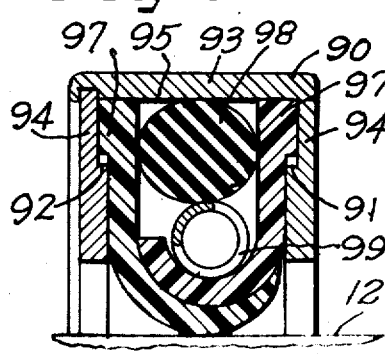
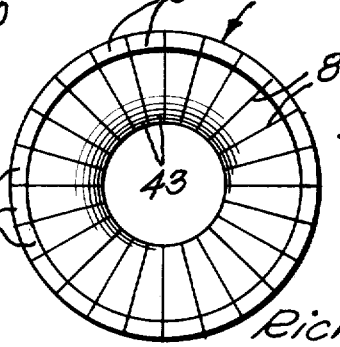
INVENTORS
Richard H. Jackson
George H. Schulz
ATTORNEYS

SEAL

BACKGROUND OF THE INVENTION

1. Field of the Invention

This invention relates to seals and more particularly to a mechanical shaft seal.

2. Prior Art

Mechanical shaft seals are known to the art. Such seals are normally of the axially projecting face type wherein the face rides against a radial abutment of the shaft or a packing type having a circumferential member or members riding against the shaft or shaft sleeve With the latter type, it is common to use multiple seal members to accommodate shaft eccentricity. This usually results in sealing gaps between the pieces allowing seal leaks. Another type of seal is known as a lip seal wherein a circumferential lip, which may be continuous, rides against the shaft or shaft-carried sleeve. Recently, such lips have been constructed of materials such as Teflon (Registered trademark of E. I. du Pont de Nemours & Co.) or other plastic or plastic-type materials which enhance the sealability of lip type seals through their cold flow characteristics. It has, however, been difficult to provide for shaft throwout in rigidly mounted lip seals. In those instances where the lip was able to accommodate axial movement of the shaft, vertical movement of the shaft was difficult to accommodate. Further, it is desirable to accommodate radial movement such as might be caused by expansion or contraction of the shaft, housing for the seal, or seal itself.

Further, it has been difficult in the prior art to provide such seals as a unit which is easily installed and replaced and which can be multiplied to provide series seals. Normally the prior art required that a seal be constructed either as a static seal, i.e., capable of sealing without rotation of the shaft, or as a rotating seal which could function either as a contact seal or in certain circumstances, a minimum gap seal. It is, however, often desirable to provide both types in a single seal assembly, a construction difficult to obtain in the prior art.

SUMMARY

Our invention overcomes the disadvantages of of the prior art by providing a single seal which has the capability to operate in situations requiring shaft eccentricity in either vertical or horizontal directions, which can accommodate radial movement, which provides a seal under both static and rotating conditions and which is economical to manufacture, install, and replace.

The seal consists of a double J-seal having two J-shaped members nestled together with the bight sections in nestled, concentric, overlapping relationship. The long legs of the J's are received in a U-shaped cross-section housing with means to retain them therein and to seal them in the housing while the inner diameter of the bight section of the inner J-member acts as a lip seal against the shaft. The housing is an equalized pressure housing and the seal members are free to move radially within the housing independently of one another.

In an illustrated modification, one of the J members may be equipped with a seal face projection adapted to sealingly contact a radial projective of the seal housing. In a further illustrated modification, one or both of the J-members are segmented to further accommodate shaft eccentricities.

It is therefore an object of this invention to provide an improved mechanical shaft seal.

It is yet another object of this invention to provide an improved mechanical lip type seal.

It is a specific object of this invention to provide a shaft seal capable of accommodating shaft movements and of providing both static and rotating seals.

It is a further and specific object of this invention to provide a shaft seal including two J-shaped seal members having their bight sections nestled together in concentric overlapping relationship with the long legs thereof spaced from one another and in sealing relation with the side walls of a seal housing.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a fragmentary partially sectioned view of two seal assemblies according to this invention received in position around a shaft.

FIG. 2 is a fragmentary cross-sectional view of one of the seal assemblies of FIG. 1 is an enlarged illustration.

FIG. 3 is a view similar to FIG. 2 illustrating the lip seal characteristics of this invention.

FIG. 4 is a view similar to FIG. 2 illustrating a modified form of the seal of this invention.

FIG. 5 is an end plan view of a modified J seal member adapted to be received in the seal assembly of this invention.

FIG. 6 is a view similar to FIG. 2 of a modified form of the seal assembly of this invention.

DESCRIPTION OF THE PREFERRED EMBODIMENTS

FIG. 1 illustrates two seal assemblies 10 according to this invention positioned within a housing 11 in encircling sealing relation with a shaft 12. Although the seal assemblies 10 are illustrated in axially spaced relationship, it will be understood that they may be used one at a time or multiply in axial contact.

As best illustrated in FIG. 2, each seal assembly 10 is preferably constructed of a substantially L-shaped cross-section ring housing member 13 which has an outer diameter leg 14 and a radial leg 15, the radial leg 15 having an open center 16 adapted to be received around and in spaced relation to a shaft 12. The end 17 of the outer diameter leg 14 is rolled over a radially extending ring member 18 having an open center 19 substantially equal to the center 16. Thus, the L-shaped member 13 and the ring member 18 comprise a U-shaped cross section ring housing.

The inner opposed faces 20 and 21 of the leg 15 and the ring 18 are stepped as at 22 and 23 with axially thicker radially inner portions 24 and 25 and relatively narrower outer portions 26 and 27 to provide opposed axial ledges 28 and 29. The steps 22 and 23 are formed intermediate the inner and outer diameters and may, as illustrated, be formed closer to the outer diameter than the inner diameter.

Positioned within the housing are two J-shaped cross section ring seal members 30 and 31, a spacer member 44, and a constricting member 33.

As illustrated, the spacer member 32 may be an O-ring while the constricting member 33 may be a coil spring.

The seal members 30 and 31 are formed in substantially a J shape with a radially extending long leg 35, 35a and a bight section 36, 36a forming the curved portion of the J. The bight portions 36, 36a are nestled together in overlapping concentric relation substantially as illustrated with the long leg portions 35, 35a spaced from one another having their axially outermost radial faces 37, 37a contacting the axially inner faces of the thicker portions 24, 25 of the leg 15 and ring 18.

The bight sections 36, 36a may be uniform in cross-sectional thickness as illustrated in the case of the bight 36a or may be tapered in decreasing cross-sectional thickness towards the free end 40 thereof as illustrated in the case of the bight 36. Preferably, the inner diameter bight 36 is tapered as at 40 to provide a lip end.

In the preferred embodiment illustrated, the radially outermost portions 42, 42a of the long legs 35, 35a of the J-shaped cross-section seal members are axially thicker providing axially extending rims 43, 43a at the radially outer ends of the long legs 35, 35a. The rims 43, 43a are sufficiently axially thick to contact the opposed faces 20, 21 of the radial leg 15 and the ring 18 above the ledges 28, 29. Thus, the rims 43, 43a cooperate with the ledges 28, 29 to maintain the J-shaped seal members within the housing while allowing independent radial movement thereof. It can be seen that as one of the J-shaped cross-section seal members moves radially with respect to the housing so that one portion thereof moves radially inwardly, the rim associated therewith will contact the ledge of the adjacent face 20, 21 to restrict further movement and retain the seal member within the housing. In order to maintain contact between the rim sections 42, 42a and the axially opposed faces 20, 21, a spacing member such as an O-ring 32 is provided between the long legs 35, 35a of the J-shaped cross-section seal members. The O-ring is preferably dimensioned with a diameter substantially equal to the normal space between the axially spaced-apart long leg sections 35, 35a and contacts them on their axially opposed faces 44, 44a. The spacing member 32 is preferably circular in cross-section so as to minimize contact area and to allow freedom of movement of the J-shaped cross-section seal members radially within the housing, however it is to be understood that spacing members other than O-rings may be used.

The J-shaped cross-section seal members are preferably formed of a material having forming capabilities sufficient to allow them to retain their shape during normal operation of the seal while being sufficiently flexible to allow sealing as hereinafter described. In certain instances, such seals may be formed of Teflon (Registered trademark of E. I. du Pont de Nemours & Co.) or other plastics or quasi-plastic materials such as polyamides and the like. In certain preferred embodiments, the material used to construct the J-shaped cross-section seal members should have cold-flow properties so as to allow it to maintain its sealability through utilization of the cold-flow properties especially of the interface between the shaft and the inner diameter face of the inner seal member 30.

Further, the use of a low-friction material enhances the ability of the seal to accommodate radial expansion of the shaft, such as may be caused by thermal expansion. In such an event, the innermost J-shaped member 30 has the ability to roll further around the outermost member 31. That is to say that the bight section 36 of the seal member 30 can move with respect to the bight section 36a of the seal member 31 to a point where the end 40 accommodates a position further up the long leg 35a of the seal member 31. This rolling or further curling may be accommodated by movement of both the bight sections to where the inner bight section 36a moves its free end 41 further up the inner wall 44 of the long leg 35 of the seal member 30.

At the same time, the coil spring 33 acts to constrict both seal members to maintain the sealing interface between the inner diameter section of the bight 36 and the shaft 12, while the free placement of the seal members within the housing accommodates pure radial or non-circumferential movement of the shaft. This movement, which may be considered as vertical in FIG. 2, will cause the entire assembly of the two J-shaped cross section seal members 30 and 31, and the constricting coil springs 33, to move vertically in the housing. This movement can continue until either of the free ends of long legs 35 and 35a contact the inner diameter section of the portion 14 of the housing, or until the portions 43, 43a of the ribs 43, 42a on the opposite side of the seal assembly contact the opposite side ledges 28, 29. Thus, shaft off-centeredness and the like can be accommodated by the free floating nature of the seal members within the housing.

In the preferred embodiment, a bleed port 45 is provided in the leg 15 of the housing above the normal positioning of the J-shaped seal members within the housing. The bleed port is open to the high-pressure side of the seal and allows equalization of pressure between the high-pressure side of the seal and the interior spaces 46 of the seal assembly. Thus, the presence of a pressure to be sealed will not cause the seal members to lift off of the shaft 12 due to their ability to accommodate circumferential expansion thereof. Further, as best illustrated in FIG. 3, the provision of the tapered end 40 on the seal member 30 allows that end to move inwardly as illustrated to function as a lip seal against the shaft 12 while maintaining sealing contact between sections of the bight portion 36a and the bight portion 36 as at 50. In the instance illustrated in FIG. 3, the high pressure from the high pressure side 51 has acted between the two J-shaped seal members to expand the tapered end portion 40 of the seal member 30 away from the bight 36a of the seal member 31 into lip seal contact with the shaft. At the same time, the same high pressure acting through the pressure port 45 has maintained contact between the seal members as indicated at 50. Should the pressure at the inner diameter of the seal assembly as at 52 exceed the pressure at the pressure port of the interior portions 46, then the two J-shaped members may release contact entirely, thereby extending the pressure therebetween into the interior spaces 46.

The provision of the pressure port 45 together with the ability of extreme high pressure to pass between the two J-shaped members in certain instances, provides a continuing pressure interiorly of the seal assembly to aid in maintaining sealing contact between the outer axial ends of the J-shaped members and the inner axial faces of the housing wall forming members 15 and 18. The spacer member 44 further aids in maintaining the J-shaped members spaced apart correctly and in contact with the side walls. Further, it is possible to lift the inner bight off of the shaft in certain situations to provide a gap seal. Also, in high-pressure conditions or in radial expansion situations, the inner bight may flatten somewhat as illustrated.

Because the seal contact is circumferential of the shaft 12 and an interface therebetween, the seal assembly is able to accommodate axial movement of the shaft which merely changes the axial point of circumferential seal contact.

FIG. 4 illustrates a modification of the seal assembly 70 corresponding to the seal assembly 10 wherein the innermost J-shaped cross section seal member 71 has an axial projection 72 thereon which extends out of the seal housing 73 to form a lip seal as at 74 for contacting a radial abutment carried by the shaft such as is illustrated at 75 of FIG. 1. The extension 72 comprises a circumferential axial projection on the seal member 71 which may be substantially L-shaped to combine with the long leg 76 of the seal member to provide a somewhat U-shaped cross-section portion of the seal member. The provision of such an axial projection provides a two-way seal to prevent pressure flow in either direction or to prevent entry of grit.

A further modification is illustrated in FIG. 5 wherein one or both of the J-shaped cross-section seal members, one of which is indicated by the numeral 80, are segmented by the provision of a plurality of radial slots 81 which may extend entirely through the seal members. The provision of the radial slots allows each seal segment 82 to operate independently of the others in a radial direction while maintaining contact with the shaft at the inner diameter 83 thereof. The provision of the coil spring 33 will act to maintain each segment in contact with the shaft while the provision of axial lips 85 corresponding with the axial lips 42 and 42a illustrated in FIG. 2 and the ledges 28 and 29 will maintain each of the segments within the housing. Thus, the individual segments will be maintained in sealed contact with the shaft and be maintained within the housing while individually acting, somewhat in the manner of individual pistons, to move in a radial direction to accommodate shaft throwout. Bleeding between the segments will be minimized by the provision of two J-shaped seal members, one of which may be unsegmented if desired, for example the radially outermost one, and by contact between the segments and the corresponding wall member of the housing. Further, the side walls of each individual segment will be in abutment with the side walls of adjacent segments and be maintained therein due to the influence of the coil spring 33.

In the modified assembly illustrated in Figure 6, the U-shaped cross section housing 90 is constructed similarly to the housing substantially the same as the housing of prior embodiments, however, it is radially shorter whereby the space between the ledges 91 and 92 corresponding to the ledges 22 and 23 of Figure 2 and the outer diameter leg 93 of the housing corresponding to leg 14 of the housing of Figure 2 is less. The provision of a shorter axially thinner space 94 serves to limit movement of the J-shaped cross section rings in the housing. The limitation of movement is away from the shaft 12.

This type of modified seal would be extremely useful in instances where the seal assembly 90 is received in an inner diameter groove in a high-speed shaft which has a secondary rotating or stationary shaft 12 received therethrough where a seal is desired between the high-speed outer shaft and the inner shaft. Provision of the modified seal 90 will prevent the J-shaped seal members from being lifted off of the shaft 12 due to the centrifugal force of rotation of the rotating seal assembly. In such embodiments, the difference in radial length between the axially thinner portions 94 from the inner diameter 95 of the portion 93 to the ledges 91 and 92 can be dimensioned with respect to the radial thickness of the bead portions 97 of the J-shaped seal members so as to allow the seal to continue to accommodate misconcentricity between the seal assembly housing and the shaft, such as can be caused by shaft radial throwout. Thus, the J-shaped seal members are not totally constrained against radial movement within the housing inasmuch as the beads 79 are radially shorter than the space between the ledges 91,92 and the inner diameter face 95 and due to the flexibility of the material of the J-shaped seal members.

It will be noted that the spacer member 98 illustrated in the embodiment of Figure 6 which corresponds to the O-ring 44 of the embodiments of Figures 2 through 4 is oval shaped. This is to indicate that any desired spacer member may be used that if an O-ring is used, it can be deformed by contact between the constricting member 99 and the inner diameter face 95. It is of course to be understood that although the embodiments are illustrated as received around a rotating shaft with the J-shaped seal members in contact with the shaft, that the seal can be reversed such that the housing is carried by the rotating member and the J-shaped seal members project radially outwardly from the housing.

It can therefore be seen from the above that my invention provides a novel shaft seal assembly which utilizes a U-shaped cross-section housing in which is received a pair of nestled overlapping J-shaped cross-section seal members, one of which provides a sealing interface with the shaft. The long legs of the J-shaped members are maintained in sealing relation with the inside side walls of the housing by a separating member, and a constricting member maintains the seal in contact with the shaft.

WE CLAIM AS OUR INVENTION:

1. A shaft seal comprising: A U-shaped cross-section housing; a J-shaped cross-section ring member received in said housing having a long leg and a bight section; the long leg thereof in contact with a radial wall of the said housing; the bight section having its inner diameter in contact with the shaft to be sealed; a second J-shaped cross-section ring member in said housing; said second ring member having a long leg and a bight section; said long leg of said second member in contact with a second radial wall of said housing; and the said bight section of the said second seal member in nestled overlying relation with the said bight section of the said first seal member.

2. In a circumferential seal, the improvement of two J-shaped cross-section seal ring members having radial legs and axially extending curved bights, the said rings positioned in bight overlapping nestled relation and the inner diameter of one of said bights forming a seal with a member to be sealed, the legs of the rings being axially spaced apart with the axially extending bight of each ring projecting towards the radial leg of the other ring.

3. The device of claim 2 wherein at least portions of the rings are received in a U-shaped cross-section ring housing.

4. The device of claim 3 wherein axially non-facing radial sides of the radial legs have portions thereof in sealing contact with inside faces of opposed portions of the said U-shaped cross-section ring.

5. The device of claim 4 wherein the said opposed portions have axial ledges formed therein by the intersection of axially thicker and axially thinner radially extending portions of the said opposed portions and the said radial legs of the said ring members terminate at their non-bight ends in axially thicker portions forming axial projections away from one another and cooperating with the ledges to form abutment members restraining movement of the said legs within the said housing towards the open end of the said housing.

6. The device of claim 5 wherein the said ring members contact the closed end wall of the said housing to restrain radial movement of the said ring members in the said housing.

7. A shaft seal comprising a substantially U-shaped cross-section housing open to the inner diameter, a first and second J-shaped cross-section ring members received in said housing with the bight section of at least one of said members projecting from the inner diameter of said housing, the bight section of the other of said members in nestled overlapping relation with the bight section of the one member interior thereof, the long legs of said first and second members in spaced apart relationship with the said housing contacting opposed faces of the radial walls of said housing, spacer means maintaining the spaced apart positioning of the long legs, constricting means urging the said bight sections radially inwardly, and the said members radially movable in said housing and movable with regard to one another.

8. The shaft seal of claim 7 wherein means are provided to retain the said members within the said housing limiting radial movement thereof.

9. The seal of claim 8 wherein the said means for limiting comprises axial ledges on opposed faces of the housing and axial projections adjacent the non-bight ends of the long legs.

10. The seal of claim 9 wherein at least one of the said ring members is radially segmented.

11. The seal of claim 7 wherein the said one of the said ring members has an axial projection thereon extending exteriorly of the said housing, the said projection forming a lip seal with a radial projection on a shaft received through the said housing.

12. A shaft seal comprising a substantially U-shaped cross section ring housing having opposed radial face, the radial faces being stepped intermediate their ends, two substantially J-shaped cross section seal members received in said housing, the said seal members having a substantially radial leg and a bight section at one end thereof, the said radial legs terminating in a stepped portion forming an axially outer rib portion, the said J-shaped members assembled in the said ring in concentric overlapping nestled relation with the said legs spaced from one another, the said ribs cooperating with the said ledges on the said housing to maintain the said J-shaped shaped ring members freely in the said housing allowing limited radial movement thereof, a spacer means in said housing interposed between the said legs of the said J-shaped members to maintain the said legs in spaced-apart relation and to maintain the said ribs in contact with portions of the said opposed radial walls of the said housing, a constricting means in said housing nestled in the bight of one of said J-shaped cross section ring members, and the said J-shaped cross section ring members being flexible.

13. The seal of claim 12 wherein the said housing is open to the inner diameter thereof and portions of the said J-shaped seal members project out of the said housing beyond the inner diameter thereof.

14. The seal of claim 12 wherein the said housing is open to the outer diameter thereof and portions of the bights of the said J-shaped ring members project radially outwardly thereof.

15. The seal of claim 12 wherein the non-bight ends of the said legs of the said J-shaped cross section seal members contact an inside face of the closed end of the said U-shaped cross section housing.

* * * * *